F. M. JOSLIN.
MACHINE FOR MAKING PARTITIONS FOR BOXES.
APPLICATION FILED FEB. 8, 1915.

1,201,308.

Patented Oct. 17, 1916.
6 SHEETS—SHEET 1.

Witnesses
G. T. Baker
B. M. Kent

Inventor
Frank M. Joslin
by Foster Freeman Watson Noil
Attorneys

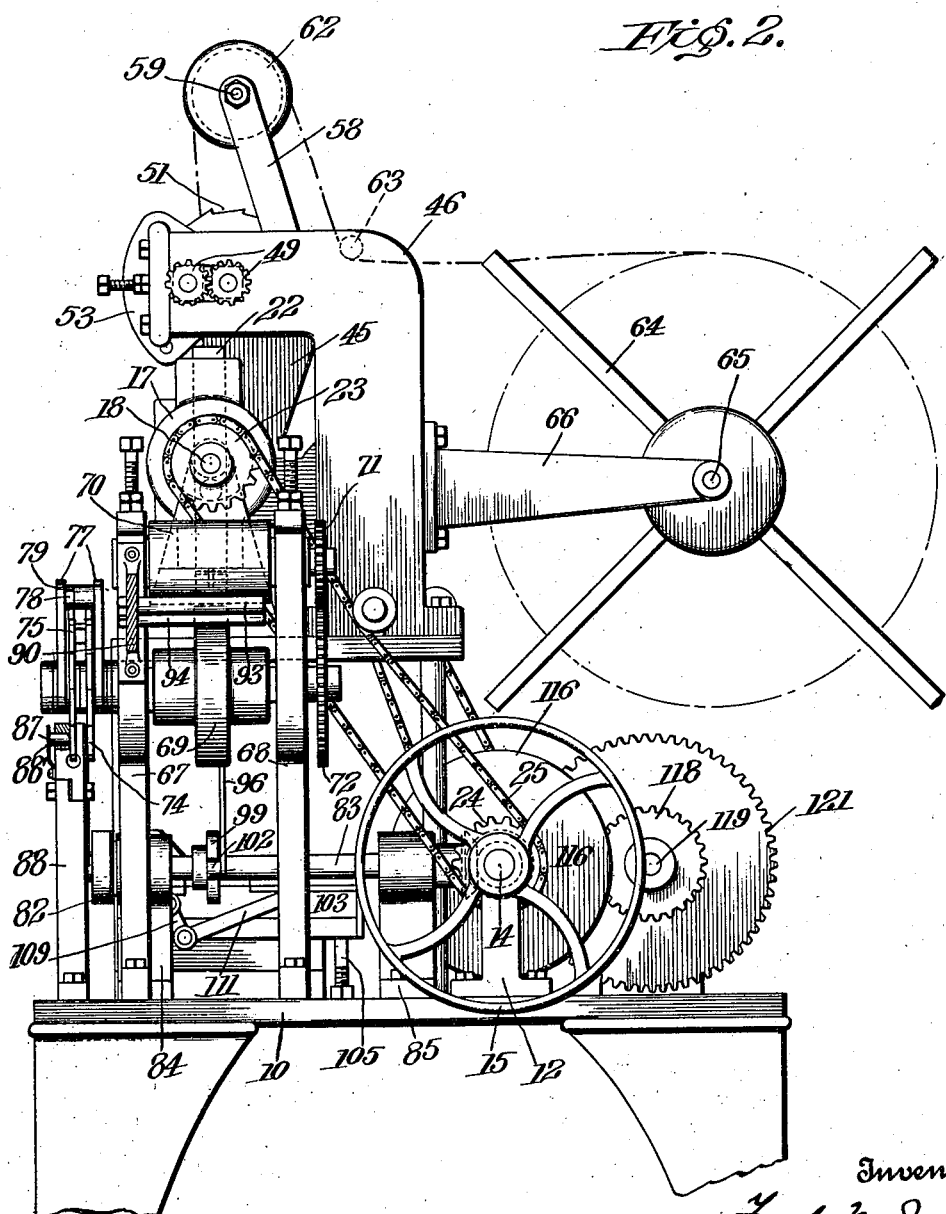

F. M. JOSLIN.
MACHINE FOR MAKING PARTITIONS FOR BOXES.
APPLICATION FILED FEB. 8, 1915.
1,201,308.
Patented Oct. 17, 1916.
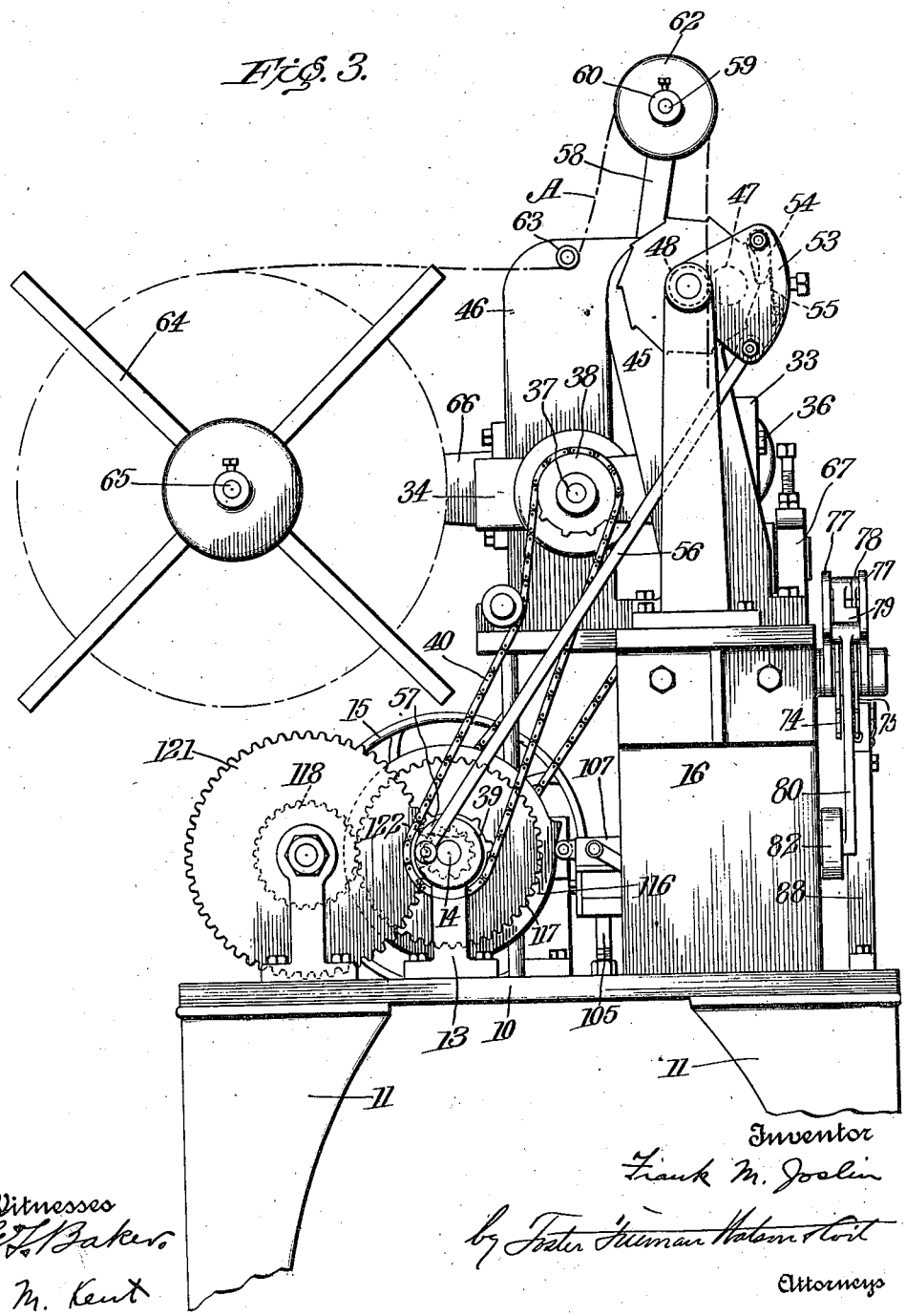

F. M. JOSLIN.
MACHINE FOR MAKING PARTITIONS FOR BOXES.
APPLICATION FILED FEB. 8, 1915.
1,201,308.
Patented Oct. 17, 1916.
6 SHEETS—SHEET 4.
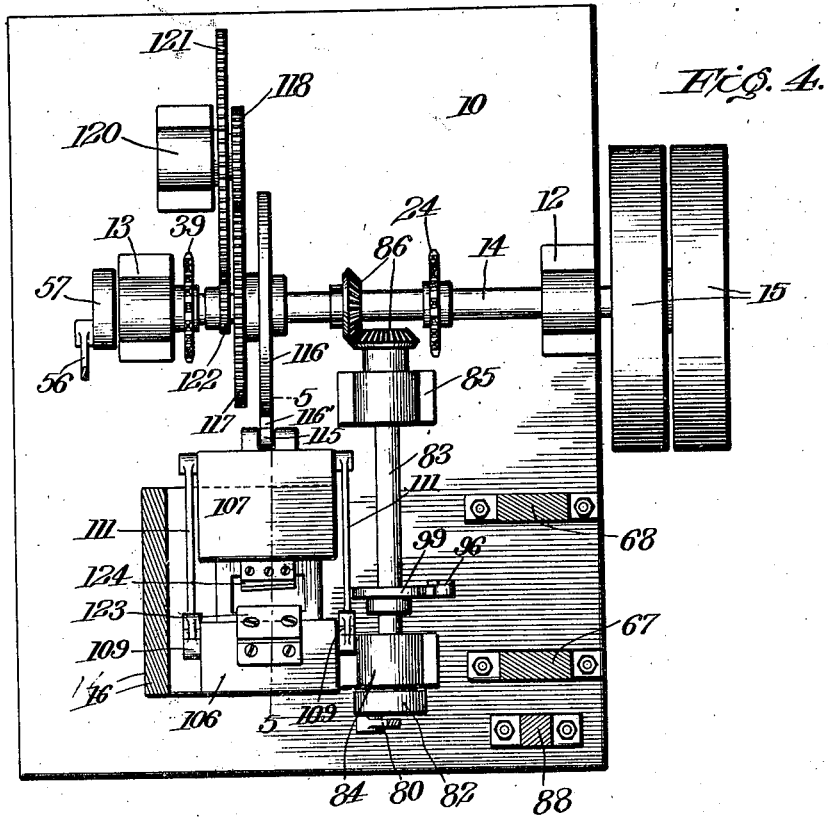
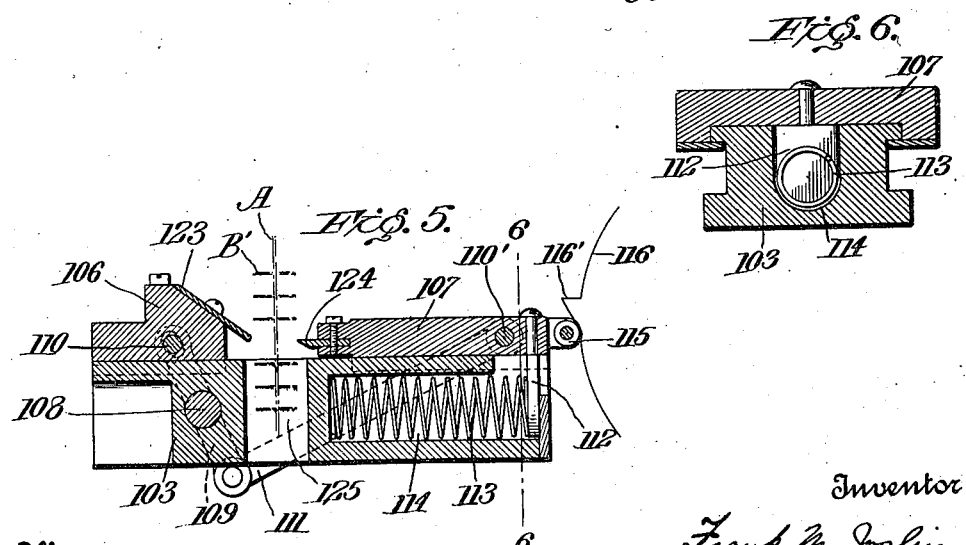
Witnesses
G. H. Baker
B. M. Kent
Inventor
Frank M. Joslin
by Foster Freeman Watson Hoit
Attorneys F. M. JOSLIN.
MACHINE FOR MAKING PARTITIONS FOR BOXES.
APPLICATION FILED FEB. 8, 1915.

1,201,308.

Patented Oct. 17, 1916.
6 SHEETS—SHEET 5.

Witnesses
G. T. Baker
B. M. Kent

Inventor
Frank M. Joslin
by Foster Freeman Watson & Coit
Attorneys

F. M. JOSLIN.
MACHINE FOR MAKING PARTITIONS FOR BOXES.
APPLICATION FILED FEB. 8, 1915.
1,201,308.
Patented Oct. 17, 1916.
6 SHEETS—SHEET 6.
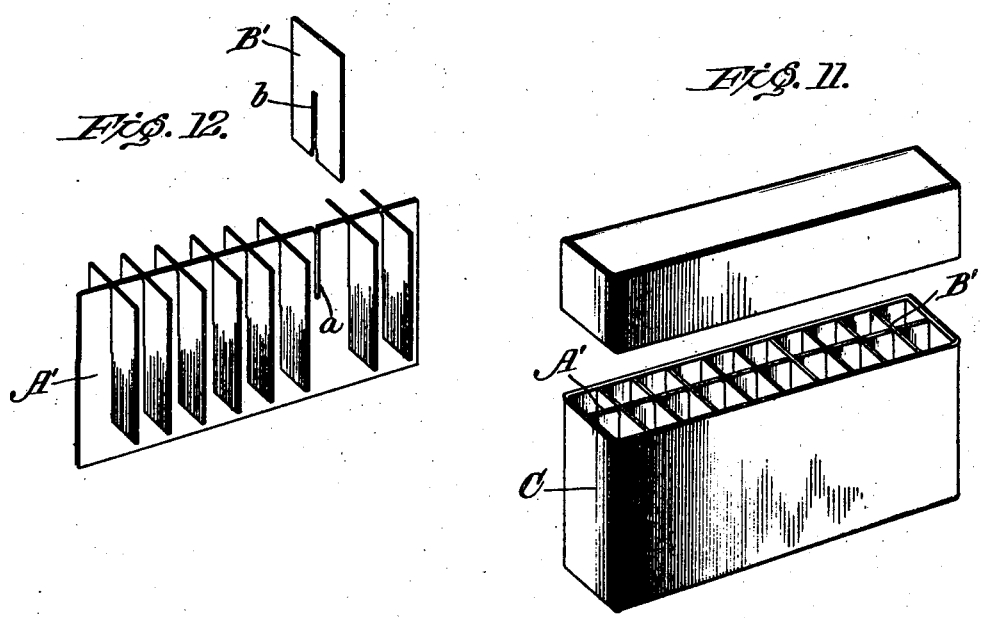
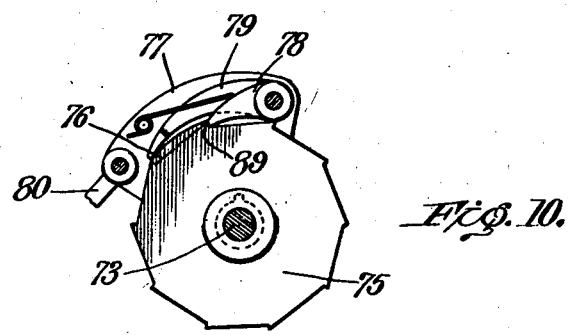

UNITED STATES PATENT OFFICE.

FRANK M. JOSLIN, OF AMSTERDAM, NEW YORK, ASSIGNOR TO INMAN MANUFACTURING COMPANY, INC., OF AMSTERDAM, NEW YORK, A CORPORATION OF NEW YORK.

MACHINE FOR MAKING PARTITIONS FOR BOXES.

1,201,308.

Specification of Letters Patent.

Patented Oct. 17, 1916.

Application filed February 8, 1915. Serial No. 6,928.

*To all whom it may concern:*

Be it known that I, FRANK M. JOSLIN, a citizen of the United States of America, and resident of Amsterdam, Montgomery county, State of New York, have invented certain new and useful Improvements in Machines for Making Partitions for Boxes, of which the following is a specification.

This invention relates to machines for making and assembling box partitions.

Figure 1:
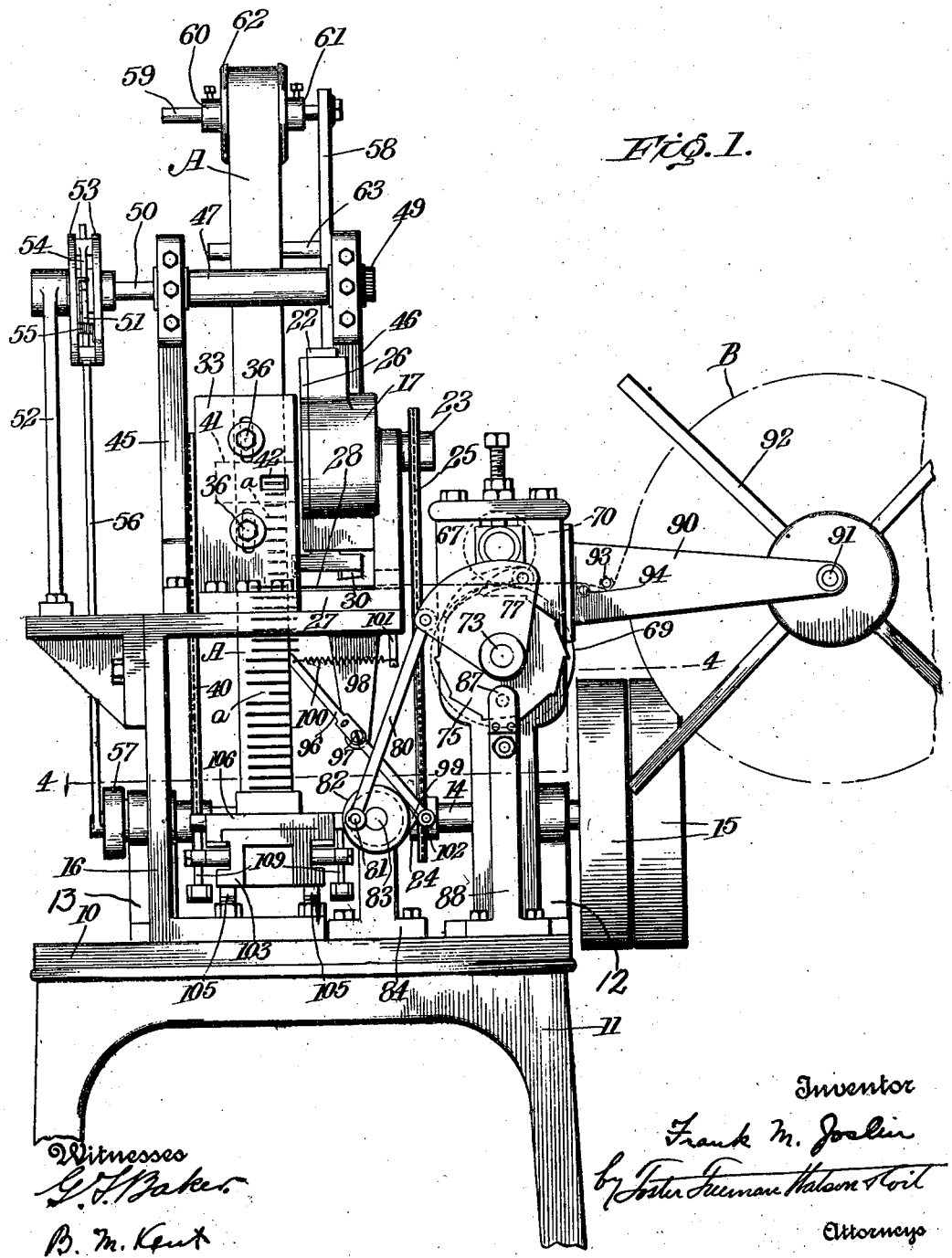
Figure 8:
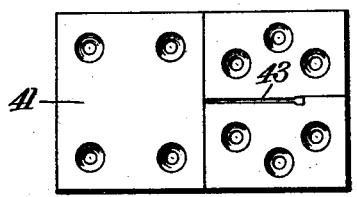
Figure 9:
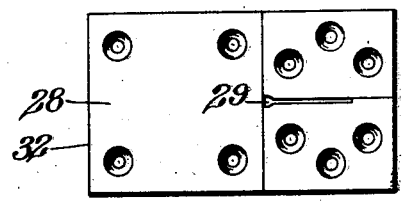
Figure 7:
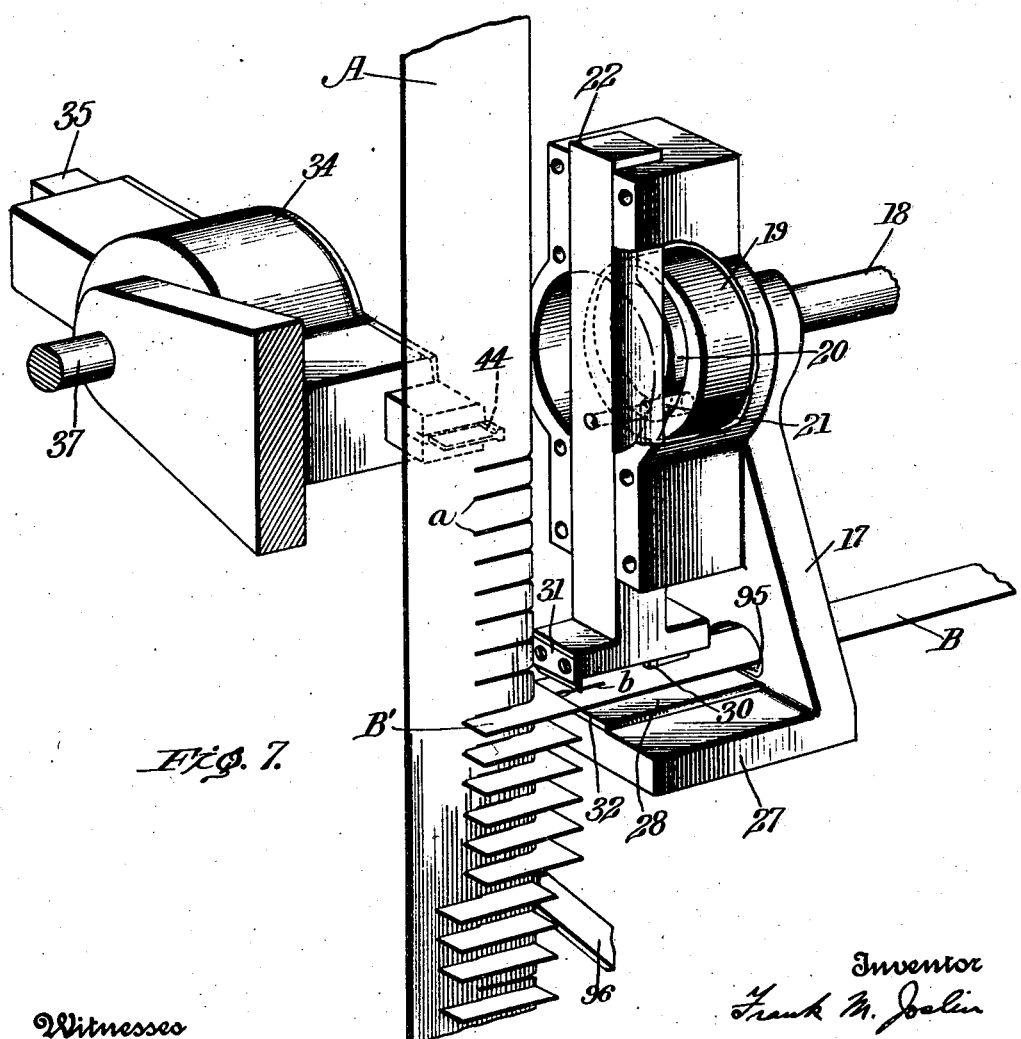

The invention has for its objects the provision of a simple machine of this character which is especially adapted to make partitions for a box in which it is desired to have two rows of cells. While the invention relates specifically to a machine for this purpose, many of the features are of general application and it is evident that the invention claimed may be embodied in machines differing from that illustrated in the accompanying drawings, in which:

Figure 1 is a side elevation; Fig. 2 is an elevation of the right hand side of Fig. 1, certain parts being removed; Fig. 3 is an elevation of the side opposite to that shown in Fig. 1; Fig. 4 is a horizontal section on the line 4—4 of Fig. 1; Fig. 5 is a section on the line 5—5 of Fig. 4; Fig. 6 is a section on the line 6—6 of Fig. 5; Fig. 7 is an enlarged perspective view of the punching mechanisms; Figs. 8 and 9 are plan views of punching dies; Fig. 10 is a detail of one of the ratchet mechanisms for feeding the material; Fig. 11 is a perspective view of a box with the partitions, as made by this machine, arranged therein; Fig. 12 is a perspective view of the partitions.

Referring to Figs. 11 and 12, it will be seen that the product formed by the machine illustrated in the drawings consists of a strip of material A' which is provided with a series of slots $a$, and has short strips B' arranged in the slots $a$. Each strip B' is provided with a slot $b$ which permits the parts to be assembled as shown in Fig. 12. In the particular product shown, the strip A' carries nine of the strips B' so that when it is placed in a box C, as shown in Fig. 11, twenty cells are provided in the box, these cells being arranged in two parallel rows.

In the machine illustrated in the drawings, the product is formed by feeding two strips of material at right angles to each other, the strips B' being fed toward the slotted edge of the strip A', as indicated in Fig. 12. It will be noted that in order to form the product shown in Fig. 12, every tenth slot $a$ must be left blank and this is accomplished by omitting every tenth feeding operation of the strip B'. The strip A' is finally severed, from the supply strip, along the blank slot $a$.

In the drawings of the machine, 10 indicates a suitable bed which is supported by means of legs 11, or in any other suitable manner, and on which are arranged the bearings 12 and 13 for the driving shaft 14. The shaft 14 is provided with the usual tight and loose pulleys or clutch 15 which may be driven by means of a belt from any suitable source of power. A bracket 16 is secured on the bed 10 and supports a bearing 17 in which a shaft 18 is journaled. The shaft 18 carries a cam member 19 having an eccentric groove 20 in one face thereof with which a pin 21 on a plunger 22 operates. The shaft 18 also carries a sprocket wheel 23 which is driven, from the sprocket 24 on the shaft 14, by means of a chain 25. The plunger 22 is retained in the bearing member 17 by means of a face plate 26 on the latter. The foot 27 of the bearing member 17 carries the die plate 28 which has an opening 29 for the punch 30, Fig. 9, carried by the plunger 22. The plunger 22 also carries a blade 31 which coöperates with the edge 32 of the plate 28 to form a shear for cutting off the material, in the manner to be hereinafter described. The bracket 16 also supports a bracket 33 on which a housing 34, for a plunger 35 and its operating cam, is adjustably secured by means of bolts 36. The plunger 35 is actuated by a cam, not shown, but similar to the cam 19 and mounted on the shaft 37. This shaft carries a sprocket 38 which is driven, from a sprocket 39 on the shaft 14, by means of a chain 40. The bracket 33 carries the die plate 41, shown in Figs. 1 and 8, and is provided with an opening 42 in line with the slot 43, in the die plate, through which punchings may be discharged. A punch 44, carried by the plunger 35, coöperates with the opening 43.

Bearing brackets 45 and 46 are supported on the bracket 16 and carry the coöperating feed rollers 47 and 48 which feed the strip of material A downwardly through the machine. The rollers 47 and 48 are operatively connected by gears 49 and the roller 48 has a shaft extension 50 upon which is secured a ratchet wheel 51. The outer end of the shaft extension 50 is supported in a bearing bracket 52. A pair of rocker arms 53 are loosely mounted on the shaft extension 50 and carry a pawl 54 which coöperates with the ratchet wheel 51. The pawl 54 is held against the ratchet wheel by means of a spring 55. (See Fig. 1). A rod 56 is pivotally connected with the arms 53 and with a crank disk 57 on the shaft 14. An arm 58 is secured to the bracket 46 and supports a shaft 59 having the spaced collars 60 and 61 thereon, between which collars a guide wheel 62 for the strip of material A is arranged. A guide roller 63, for the strip A, is supported by the bracket 46, and the strip leads under this roller from the supply reel 64, which is rotatably supported on a shaft 65 carried by the bracket 66. From the feed rollers 47 and 48, the strip A passes downwardly between the punch 44 and the die plate 41, where it receives the uniformly spaced slots $a$.

The base 10 has secured thereon the housings 67 and 68, in which are journaled the feed rolls 69 and 70 which are operatively connected by a pair of gear wheels 71 and 72. The shaft 73 of the feed roll 69 carries the ratchet wheel 74, which is keyed to the shaft, and a ratchet wheel 75 which is loose on the shaft. The ratchet wheels 74 and 75 are of similar construction except that the wheel 75 has one tooth omitted as indicated at the point 76 in Fig. 10. A pair of rocking arms 77 are loosely arranged on the shaft 73 and carry two pawls 78 and 79, the pawl 78 engaging the wheel 75 and the pawl 79 engaging both ratchet wheels. The arms 77 are rocked by means of a connecting rod 80 which is actuated by a crank pin 81 on a disk 82, this disk being carried by a shaft 83. The shaft 83 is rotatably supported in bearings 84 and 85 and is driven from the shaft 14 by means of a pair of bevel wheels 86. (See Fig. 4). A friction pin 87, carried by a bracket 88, is pressed against the side of the disk 75 by a spring 88' and holds the disk stationary, between successive forward movements thereof, against the dragging action of the pawls during their rearward movement. (See Fig. 2).

The operation of this feeding mechanism is as follows: The pawl 79 simultaneously engages corresponding teeth on the wheels 74 and 75, and the pawl 78 engages the next following tooth on the wheel 75, and normally both ratchet wheels will be moved ahead simultaneously by the pawls. Referring to Figs. 1 and 10, it will be seen that, in the position shown, the toe of the pawl 79 engages the blank part 76 of the wheel 75, whereas the pawl 78 engages the tooth 89 next following the blank 76. On the succeeding rocking movement of the arm 77, the wheel 75 will be carried forward by the pawl 78, but the pawl 79 will be held out of engagement with the tooth on the ratchet wheel 74, and hence the latter will not be moved. On the return movement of the arm 77, the pawl 79 will engage the tooth 89 and the opposite tooth on the wheel 74, and on the succeeding forward movement of the arms both ratchet wheels will be carried forward together. The ratchet wheel 74 has ten teeth and the wheel 75 has nine teeth, so that on every tenth forward rocking movement of the arm 77 the wheel 74 and the shaft 73 will not be actuated. This will result in an omission of the feeding movement of the rolls 69 and 70 and the strip B on every tenth feeding movement of the arms 77.

An arm 90 is secured on the housing 67 and carries a shaft 91 on which is mounted a reel 92 for the strip of material B. The strip B passes under a guide roller 93 and over a guide roller 94 carried by the arm 90, and thence between the feed rollers 69 and 70 and through an opening 95 in the bracket 17, to a position over the die plate 28.

After each feeding operation of the strip B, the plunger 22 is actuated to cut off the section B' and simultaneously make the slot $b$ in the strip B. After the operation of the plunger 22, the strip A is fed downwardly to bring a slot $a$ in alinement with the strip B and then the latter strip is fed forward to carry the end thereof into the slot $a$, as shown in Fig. 7. The plunger 22 again descends and cuts off the end section B', and this series of operations is repeated until nine of the sections B' have been placed in successive slots $a$ in the strip A. The regular feeding movement of the strip B is then omitted, by the action of the ratchet wheels 74 and 75 in the manner above described, so that a section B' will be omitted from one of the slots $a$. The strip A is fed downwardly and then for nine successive operations the strip B will be fed forward and sections B' placed in the slots $a$. It will be noted that the sections B', when severed from strip B, project a slight distance from the edge of the strip A and, in order that these sections may be moved farther into the strip A so as to have the arrangement shown in Fig. 12, I have provided a swinging arm 96 which is pivoted at 97 on a bracket 98 and actuated by a cam 99 on the shaft 83. A spring 100 engages the upper end of the arm 96 and extends to a post 101 and tends to hold the roller 102, carried by the lower end of the arm 96, against the cam 99. On each oscillation of the arm 96, the upper end thereof engages the projecting end of the strip section B' and pushes this section to its final position on the strip A.

The product is then complete except for cutting the strip A into the sections A', and for this purpose, there is provided a base 103 which is adjustably supported on four bolts 105 and which serves as a guide for the slides 106 and 107. The base 103 has journaled therein a rock shaft 108 on which the levers 109 are secured. The upper ends of the levers 109 have elongated slots which engage a pin 110, carried by the slide 106, so that when the shaft 108 is rocked the slide will be reciprocated on the base 103. The slide 107 carries a pin 110, and rods, 111, connect this pin with the lower ends of the levers 109. In this way the slides 106 and 107 are so connected that they are caused to move to and from each other simultaneously. The slide 107 carries an arm 112 which is engaged by a spring 113, arranged in a pocket 114 in the base 103, and this spring acts to hold the roller 115, which is carried by the slide 107, against the cam 116. The cam 116 is rotatably mounted on the shaft 14 and has rigidly connected therewith a gear wheel 117 which meshes with a gear 118 on a shaft 119. The shaft 119 is supported by a bearing member 120 and the gear 118 has rigidly connected therewith a gear 121 which meshes with a pinion 122 secured to the shaft 14. The train of gears 117, 118, 121 and 122 cause the cam 116 to rotate at one-tenth the speed of the shaft 14 and since the feeding operations of the strips of material occur once for every revolution of the shaft 14, it will be evident that the slides 106 and 107 will be actuated by projection 116' on the cam 116 once for every ten feeding operations of the strip A. The slide 106 carries a knife 123 and the slide 107 carries a knife 124, these knives coöperating to shear the strip A at each blank slot a. After each cutting operation, the knives 123 and 124 are separated to permit the strip A, with the sections B' thereon, to be fed downwardly between the knives. The base 103 is provided with a slot 125 for the passage of the strip A and the bed 10 is also provided with a slot which registers with the slot 125. After each cutting operation of the knives 123 and 124, the severed section A' falls through the slots, just referred to, into any suitable receptacle arranged below the bed 10.

Having thus described the invention, what is claimed is:

1. In a machine of the class described, the combination of means for feeding a strip of material, means for slotting said strip, means for feeding another strip of material into the slots in the first-mentioned strip, means for cutting the second-mentioned strip into sections, means for rendering the second-mentioned feeding means inoperative at pretermined intervals in order to leave blank predetermined slots in the first-mentioned strip, and means for cutting the first-mentioned strip into sections.

2. In a machine of the class described, the combination of means for feeding a strip of material, means for slotting said strip, means for feeding another strip of material into the slots in the first-mentioned strip, means for cutting off sections of the second-mentioned strip after they are placed in said slots, means for rendering the second-mentioned feeding means inoperative at predetermined intervals in order to leave blank predetermined slots in the first-mentioned strip, and intermittently operating means for cutting the first-mentioned strip at the blank slots therein.

3. In a machine of the class described, the combination of intermittently operating means for feeding a strip of material, means for slotting one edge of the strip at regular intervals, intermittently operating means for feeding another strip of material into the slots in the first-mentioned strip, means for cutting off sections from the end of the second-mentioned strip so that these sections will be carried in the slots in the first-mentioned strip, means for rendering the second-mentioned feeding means inoperative at predetermined intervals in order to leave blank predetermined slots in the first-mentioned strip, and means for cutting the first-mentioned strip at the blank slots therein.

4. In a machine of the class described, the combination of intermittently operating means for feeding a strip of material, means for slotting one edge of the strip at regular intervals, intermittently operating means for feeding another strip of material into the slots in the first-mentioned strip, in the direction of the width of the latter, means for cutting off sections from the end of the second-mentioned strip so that these sections will be carried in the slots in the first-mentioned strip, means for rendering the second-mentioned feeding means inoperative at predetermined intervals in order to leave blank predetermined slots in the first mentioned strip, and intermittently operating means for cutting the first-mentioned strip into sections.

In testimony whereof I affix my signature in presence of two witnesses.

FRANK M. JOSLIN.

Witnesses:
 JAMES W. FERGUSON,
 CLARA I. RAWDON.